United States Patent Office 3,039,948
Patented June 19, 1962

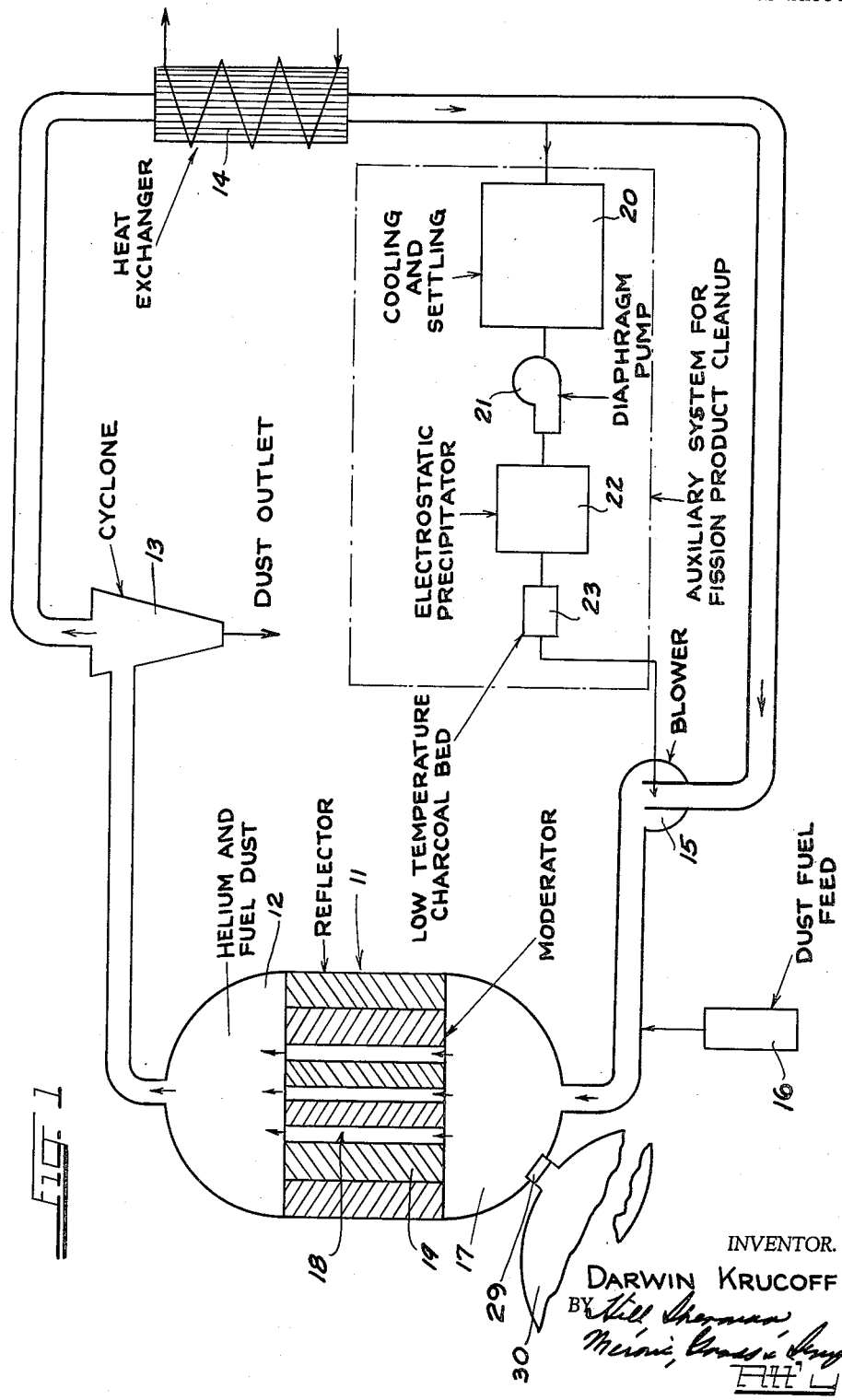

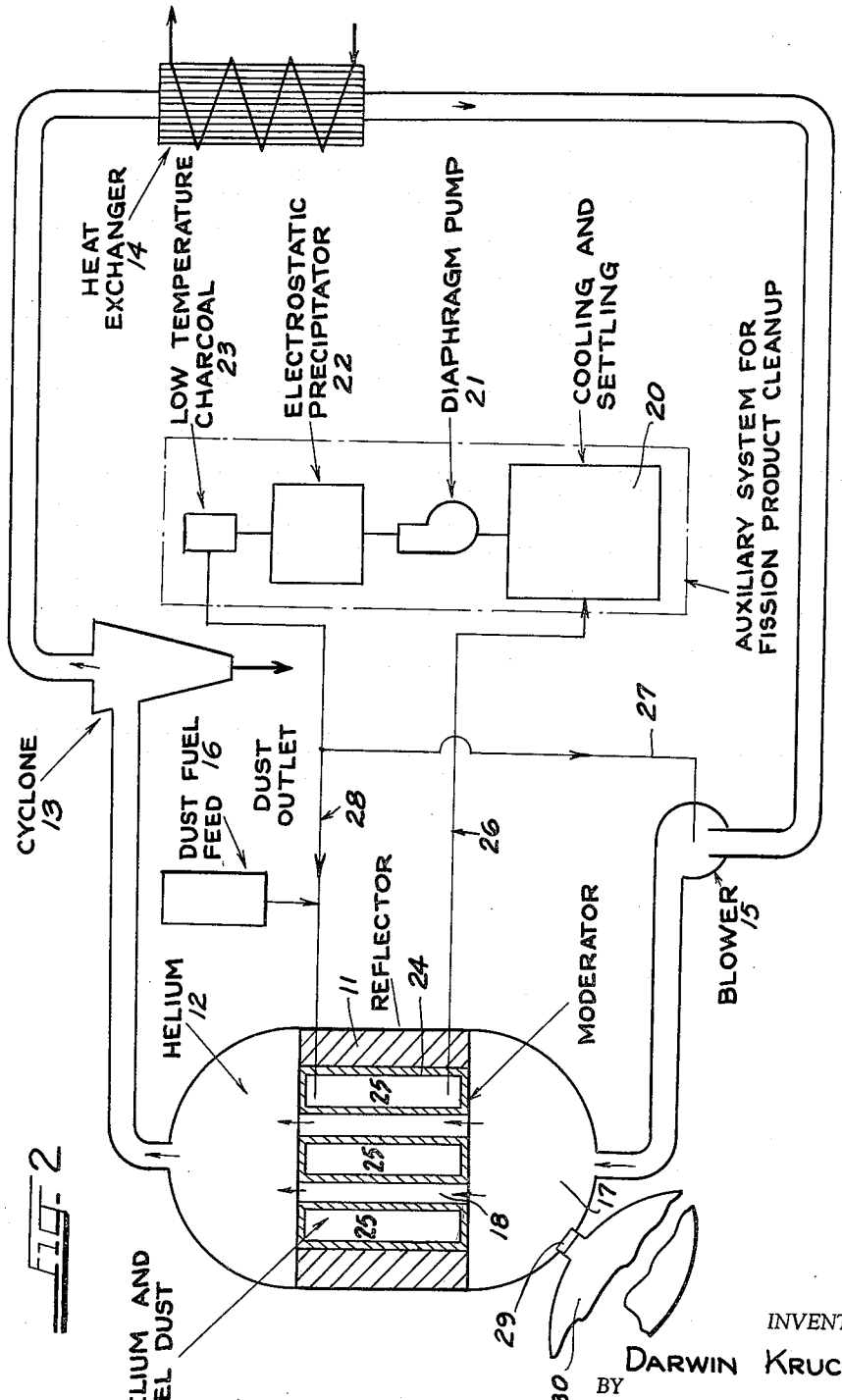

3,039,948
NUCLEAR REACTOR WITH POWDERED FUEL
Darwin Krucoff, Chicago, Ill., assignor, by mesne assignments, to the United States of America as represented by the United States Atomic Energy Commission
Filed Mar. 14, 1958, Ser. No. 721,462
3 Claims. (Cl. 204—193.2)

The instant invention relates to a new type of nuclear reactor, novel fuel for such reactor, and a novel process for generating nuclear energy and making available the usable energy so produced. More particularly, my invention is derived from the basic concept of utilizing a reactor fuel composed of particulate, fissionable dust carried in a suitable gas, and is further directed to the related means and apparatus whereby the beneficial characteristics of such dust are usefully exploited.

A primary object of my invention is to provide a new type nuclear reactor fuel, namely, a fissionable dust borne in a gaseous environment.

Another object of my invention is to provide a novel nuclear reactor which utilizes a fissionable dust as its energy source.

Still another object of my invention is to provide a novel nuclear reactor apparatus which may be readily controlled.

A further object of my invention is to provide a novel process whereby nuclear energy is utilized.

Yet another object of my invention is to provide a novel method of deriving heat from a fission reaction.

Yet a further object of my invention is to provide a nuclear reactor apparatus which is capable of operation at extremely elevated temperatures.

Other objects, features and advantages of the instant invention will become apparent to those skilled in this particular art from the following detailed disclosure thereof, particularly when considered in conjunction with the incorporated drawings in which:

FIGURE 1 represents one embodiment of a nuclear reactor produced in accordance with my invention; and
FIGURE 2 represents the second embodiment thereof.

Before entering into a detailed description of my invention the novel concepts involved therein and the background therefore should first be generally considered. As part of such background, it is recognized that economic power production from nuclear energy, and particularly such production by the utilization of nuclear reactors as heat sources in the chemical process industries, or the like, requires operation at considerably elevated temperatures. By way of illustration, in the use of conventional furnaces and boilers, temperatures in the range of 2000° to 3000° F. are commonly achieved. It is further recognized by those skilled in this art that nuclear reactors are potentially capable of producing such and even higher temperatures. The question has been how to do this, and it is to the solution thereof that the instant invention is primarily directed.

Present day reactor operating temperatures have been limited by the form and composition of the fuels utilized therewith and the nature of the available coolant and moderator elements. Reactors having metallic fuel elements are of limited temperature scope due to increased corrosion and loss of strength with increased temperature.

Added to the limitations derived from the fuel element are those resulting from the coolants employed. In many installations water has been so used and has limited exit coolant temperature to the order of 600° C., this being primarily due to the excessive pressure required for higher temperatures. Likewise, contrary to high temperature usage of presently known nuclear reactors are the facts that available organic coolants decompose at elevated temperatures and liquid metals become excessively corrosive.

As further background to my invention, it is known that ceramic fuel elements have been under consideration and the use of such elements particularly in conjunction with a ceramic moderator and a gas coolant has appeared attractive. However, control of a reactor constructed with such components is an extremely difficult task in view of the problems involved in operating control rods at extremely high temperatures, and further, to the positive temperature coefficient contribution resulting from decreasing xenon cross-section with increasing temperature. In addition to such deterrent features, initial fuel element fabrication and subsequent reprocessing are extremely serious cost items.

Such background problems have provided me with the impetus to consider a reactor which is analogous in some respects to the usual furnace system, i.e., one constructed of appropriate ceramic materials and containing a gaseous fuel. As above indicated, the crux of my invention lies in the development and use of a nuclear fuel composed of a fissionable dust carried in a suitable gas. Such fuel provides all readily recognized advantages of a fluid fuel system with the additional beneficial results to reactor technology of greatly reduced corrosion effects and inherent high temperature capabilities. As exemplary of the latter, temperatures in the range of 2000 to 3000° F. or even higher, are feasible in an all-ceramic lined-gas containing reactor core. Also in reactors produced in accordance with my invention, a high conversion ratio of fertile to fissionable material is assured due to the virtual elimination of neutron poisons. It should be apparent that all of the above limitations found in the prior art are not encountered with the use of the instant, novel fluid fuel, i.e., fuel such as fissionable uranium oxide or uranium carbide entrained as a fine dust in a gas such as helium. This fuel is inherently capable of high temperature operation and not only eliminates fuel element fabrication and reprocessing but further provides unlimited burn-up capabilities, excellent heat transfer to the working fluid, and ease of control without the necessity for control rods. Combined with such desirable features is the fact that helium is essentially an ideal fuel carrier from the nuclear, chemical and heat transfer aspects and virtually eliminates corrosion problems. As is later more fully detailed, other gases and other fissionable dusts may likewise be used.

With the foregoing in view, it should be evident that dust fueled reactors are exceptionally promising for applications such as chemical process heat generation, electric power production and as a high flux test reactor.

In general, a reactor produced in accordance with my invention has a fairly simple structure. The core, in one embodiment, may be a block of ceramic moderator material such as graphite or beryllium oxide penetrated with through holes for passage of the fuel-laden gas. In order to provide chemical compatibility, if for example graphite is used as the moderator, the fuel dust should be uranium carbide or the like and the ducts and chambers in contact with the fuel preferably should be lined wtih a carbide, as for example that of silicon to minimize erosion. On the other hand, if beryllium oxide is used as the moderator the fuel dust should be uranium dioxide or the like and conduit lining should be of aluminum oxide or similar materials, while the moderator ducts themselves, because of the hardness of BeO need not be lined.

The instant disclosure presents both externally and internally cooled versions of the dust fuel reactor (hereinafter at times referred to as the ADFR—the initial "A" being derived from the name of the original assignee of the present invention). By externally cooled is meant a reactor as shown in FIGURE 1 wherein the primary or energy removal loop contains radioactive particles. On the other hand, by internally cooled is meant a reactor as illustrated in FIGURE 2 wherein such primary loop contains only a radioactive-free heat transfer medium. Generally speaking, the externally cooled type permits the simple core referred to above and has extremely high heat removal capabilities. The flux and power densities are limited only by erosion effects and the upper limit of fluid velocity through the core as determined by the economics of the pumping power requirements. By the use of ultrafine fuel dust particles and limited fuel concentration with resultant minimal erosion such externally cooled ADFR is capable of providing high power densities. The internally cooled embodiment, on the other hand, requires a somewhat more complex core to separate the fuel bearing fluid from the coolant; however, the use of such latter reactor provides a non-radioactive primary loop which in turn simplifies maintenance problems. Erosion is substantially eliminated since the fluid fuel is practically stationary except for thermal convection currents which are adequate to maintain the suspension, provided of course that particle sizes within a proper range are utilized. Such embodiments will next be considered in greater detail.

Referring first to FIGURE 1 which illustrates an externally cooled ADFR: high temperature fluid, as for example helium and fuel dust, leaves the reactor core 11 and the upper plenum chamber 12 to enter a cyclone separator 13 which effectively removes all particles larger than 10 microns from the fluid system. Such large particles might arise from thermal decomposition or physical erosion of the ceramic lining. Following exit from the cyclone separator, the fluid next enters a heat exchanger 14 or the like, in which useful heat is extracted. Following passage through the heat exchanger most of the fluid enters a blower 15 and is recirculated through the reactor system while a small portion of such flow is directed through a fission product removal system, the latter system being described below. After passage through the blower, required amounts of additional dust fuel feed, as determined by the operator, are entrained into the system from the fuel receptacle 16 positioned between the blower and the lower plenum chamber 17, and the cycle again commences. It should be understood that such cycle is continuous but for purposes of description has been discussed as a series of individual steps.

In such externally cooled system the reactor core 11 is of extremely simple construction. As shown in FIGURE 1, it contains a series of ducts 18 in a ceramic moderator material 19. In some instances it may be necessary to line such ducts with a protective material such as silicon carbide.

The auxiliary system for fission product clean-up should next be considered. As above indicated, a small portion of the gaseous borne fuel dust is passed through this system during each cycle. Such system accepts a small bleed stream from the reactor fuel system after passage through the heat exchanger. The fluid is first passed through the cooling and settling chamber 20 in which larger dust particles are removed. From such chamber the fuel is transmitted through a diaphragm pump 21 or the like and directed into an electrostatic precipitator which removes all particulate matter including the fuel dust from the gaseous carrier. Following such removal, the remaining gas is passed through a low temperature charcoal bed 23 or the like, to remove all extraneous gases from the carrier gas which may be then returned to the reactor circulating system, depending on the gas used, making its entry at the blower region.

It should be understood that in both embodiments of my invention all ducts are lined with ceramic thermal insulation and are further covered with a gas-impermeable metal skin. Where required, or desirable, double metal walls may be utilized to both detect and further reduce gas leakage.

The operation of the aforedescribed embodiment may be readily seen. For purposes of example, the system will include a fine dust of fissionable uranium oxide borne in helium gas, a moderator of beryllium oxide, and conduit linings composed of aluminum oxide. The fission reaction heats the helium gas and the dust in the reactor core which heat is then made available for use through the mechanism of the heat exchanger. The fuel material removed in the auxiliary clean-up system may be later re-used in some instances without further reprocessing. The safety features and operation of safety elements will be discussed below.

Turning next to FIGURE 2 which is illustrative of an internally cooled ADFR system: in this instance pure helium or the like is used as a coolant and is separated from fuel-bearing helium or another suitable gas in the core by the walls of moderator material. Such walls 24 form substantially closed but interconnected fuel-bearing chambers and are not gas tight, but by maintaining the pure helium system at a slightly higher pressure than that of the fueled region the only leakage results into the latter. In a manner similar to that of the externally cooled system, fission products are removed in the auxiliary clean-up system and a non-radioactive carrier gas returned to the primary loop. The net result of the internally cooled system is that the radioactivity is confined within the moderator chambers and the clean-up system. Thus it is seen the components of the internally cooled ADFR are essentially the same as in the externally cooled system except for the design of the reactor core and the fact that only helium or another suitable gas is circulated through the external system rather than the helium-fuel dust mixture.

More specifically in FIGURE 2, the reactor core 11 has a series of interconnected reaction chambers 25 formed by the moderator walls 24. A duct 26 leads from the reaction chambers to the auxiliary system for fission product clean-up which has the same components as in the system described above, viz., a cooling and settling chamber 20, the diaphragm pump 21, an electrostatic precipitator 22 and a low-temperature charcoal bed 23. From the latter the radioactive particle-free helium passes in part to the external helium system via duct 27 and in part back to the reaction chamber via duct 28 to continually maintain the dust-in-helium suspension. As required, additional fuel dust is fed into the carrier gas from the dust fuel feed chamber 16.

Only a non-radioactive gas, free of dust particles circulates in the primary loop. Such gas circulates through the ducts 18 in core 11, the upper plenum chamber 12, a cyclone separator 13, the heat exchanger 14 and back to the lower plenum chambers 17 after passage through blower 15. The functioning of the internally cooled reactor may be most readily visualized by comparing the core to a heat exchanger. Again, for purposes of example and ease of description the system containing uranium oxide dust and helium gas as a fuel, a moderator composed of beryllium oxide, and duct linings of aluminum oxide will be used. Fission occurs in the reaction chamber 25 to rapidly heat the helium-dust mixture. At the same time comparatively cool helium in passing through ducts 18 is heated which heat is then taken off in the heat exchanger 14.

The use of moderator material to separate the fuel and coolant fluids retains the high neutron economy of the externally cooled system. Furthermore, additional moderator may be positioned in either fluid and the reactor operated epithermally, or under moderated. Additional moderator in the coolant channels may be used to increase the surface to volume ratio of the channels for increased heat transfer.

Fuel dust particles of small size provide adequate suspension stability for use with the instant invention. Stokes Law illustrates that for uranium carbide in helium at atmospheric pressure, particles of 1 micron have a terminal velocity of 0.03 cm. per second and that such value is proportional to the square of the particle diameter. Thus only a small vertical component of gas velocity is required to entrain such fine particle. Since average particle sizes of 1 or 2 microns are readily obtainable and further since these are markedly reduced during reactor operation due to mechanical attrition, the fission process itself and radiation, there is no major problem in obtaining stable suspensions of such minute size particles. The most powerful of the attrition processes will probably be the fission process for fission products have a range of about 5 microns in solids and will thus be ejected from the particles. As a practical matter, the average particle size in the core will be actually considerably below 1 micron and for such small sizes the required entrainment velocities are so low that in the internally cooled reactor thermal convection currents alone maintain the suspension.

For electric power production, a requirement of which is steam at a temperature of from 1000 to 1200° F., a heat exchanger resembling a conventional metallic boiler may be used with high temperature helium replacing about the same temperature combustion gas. Where higher temperatures are required a ceramic heat exchanger must be used. Double wall design for such exchanger is preferable to prevent fission product leakage, for at 2500° F. and above, essentially all transfer is through radiation. Helium is circulated between the two walls of such exchanger to sweep away any fission products leaking through the first wall.

In the internally cooled system heat transfer from the fuel to the coolant gas, e.g., helium, is a factor which limits power density. At the high temperatures available from my invention heat transfer from the fuel to the separating wall and from the wall to the coolant will be largely by radiation with conduction limited primarily to the heat transfer across the wall. Since both beryllium oxide and graphite have extremely high thermal conductivity and can readily tolerate the large thermal gradients attainable with the instant reactor the above considerations based on very high temperature operations show that considerable power density is possible with the internally cooled system.

As above stated, helium is the ideal gas for use with the instant invention, both as a fuel carrier and a coolant. At the present time it appears the most promising for use with the carbide system of reactor core and duct lining materials. It must be recognized that the gas must not react with such materials. On the other hand in the aforementioned oxide system, gases such as air, carbon dioxide, oxygen, carbon monoxide and nitrogen may be used. To those skilled in this art the reason for the carrier selection for both the carbide and oxide systems will be apparent: since the carbide constituents may be oxidized at elevated temperatures, non-oxidizing gases such as helium are preferred. The oxide system, on the other hand, is not effected by the oxidizing capabilities of the gas stream.

The use of gas entrained dust as fuel is particularly attractive in the area of reactor control. The removal of fuel dust from the core by fluid expansion as well as by moderator expansion results in a large negative temperature coefficient which provides stability of operation. The stability of my reactor is further enhanced by the continuous removal of xenon 135. Such isotope has a high cross section which decreases with neutron temperature in the range of the operating temperatures herein. The fission product removal system reduces the equilibrium concentration of xenon 135 to extremely small values.

It should also be evident that the ADFR is an unusually safe reactor. When required, fast emergency shutdown may be obtained by simply opening a valve 29, or causing a dangerous occurrence to open such valve, and allowing the fluid fuel to expand into a chamber 30 adjacent to the core. The absence of chemical reactants and water from the reactor system removes the possibility of chemical or steam explosion and additionally the negative temperature coefficient and the ability of the core to tolerate large temperature fluctuations can accommodate a considerable amount of excess reactivity. If it happens that sufficient excess reactivity is introduced to cause severe pressure transients the impulse is relieved by a diaphragm valve designed to rupture at a given over pressure analogous to a safety release valve. This rupturing effect allows fuel to expand into a chamber adjacent to the core and thus the reactor is shut down. Another safety factor is that in the event of blower failure in the externally cooled system and subsequent settling of dust in the lower plenum chamber and other parts of the system, these dust beds would not be critical due to the lack of moderator and poor geometry.

The chemical inertness of the helium carrier fluid in an ADFR makes this system extremely attractive in respect to corrosion considerations. Chemical compatibility between the fuel compound, moderator and duct lining material is achieved in a carbide system by using uranium carbide, graphite and silicon carbide and in an oxide system by using uranium dioxide, beryllium oxide and aluminum oxide. Such configurations and combinations of materials limits corrosion primarily to that due to the impurities in helium, principally air and water vapor.

In the carbide system oxygen and water vapor react rapidly with both graphite and uranium carbide at elevated temperatures. This factor may require the use of a chemical getter such as entrained graphite dust to remove the substances and restricts their allowable leakage into the system to very low values. In some instances here a secondary helium loop may be utilized for heat removal.

The oxide system can tolerate relatively large amounts of dry air since such air is essentially not reactive with the oxides in the system. Water vapor attacks beryllium at high temperatures and thus should be excluded. Again a secondary heat transfer loop may be used where required and in this case would contain dry air or $CO_2$ and leakage losses would be of such substances.

Where deemed necessary, it is practical to line all passages with abrasion resistant materials such as silicon carbide in the carbide system. Such silicon carbide linings may be quite thick, perhaps 3/8 of an inch in the core and thicker elsewhere and thus considerable erosion may be tolerated. The oxide system on the other hand, would not require such lining since beryllium oxide itself is extremely hard. Also uranium dioxide is considerably softer than uranium carbide; thus the oxide system offers advantages with respect to erosion as well as the previously mentioned corrosion effects.

In my invention the fuel reprocessing for fission product removal compares quite favorably with conventional reprocessing due to the ease of separation of the fuel from the gaseous carrier. A chemical separation is required only between the fuel dust and the fission product and ceramic abrasion dust. This requires handling of only a very small fraction of the material normally handled in a reprocessing plant and results in useful fission product concentrations rather than low level radioactive waste solutions.

Also by my invention, maximum neutron economy is attained by the elimination of many neutron poisons present normally in the reactor. Such poisons include control rods, fuel element matrix and cladding materials, structural material and much of the fission products. Breeding is therefore possible by using the thorium-uranium 233 cycle. The thorium may be introduced into the reactor core as entrained dust or in a more dense breeder blanket as a dust bed. A single region is more feasible for the internally cooled system which has low fuel velocities and thus can tolerate heavier dust loadings.

I claim as my invention:

1. A nuclear reactor comprising a core consisting of a moderator material selected from the group consisting of graphite and beryllium oxide, said moderator material forming the walls of a plurality of interconnected reaction chambers and the walls of a plurality of coolant ducts disposed between the reaction chambers, a suspension of a fuel material selected from the group consisting of uranium dioxide and uranium carbide in a gas which is nonreactive with the moderator material and fuel material in said reaction chambers, said fuel material having an average particle size less than one micron whereby it is maintained in suspension by thermal convection currents, means for passing said nonreactive gas through the coolant ducts at a pressure greater than that present in the reaction chambers, and an auxiliary system for fission product clean-up connected to said reaction chambers.

2. A nuclear reactor according to claim 1 wherein said moderator material is graphite, said fuel material is uranium carbide and said gas is helium.

3. A nuclear reactor according to claim 1 wherein said moderator material is beryllium oxide, said fuel material is uranium dioxide, and said gas is helium.

References Cited in the file of this patent

UNITED STATES PATENTS

| | | |
|---|---|---|
| 2,782,158 | Wheeler | Feb. 19, 1957 |
| 2,809,931 | Daniels | Oct. 15, 1957 |
| 2,863,814 | Kesselring et al. | Dec. 9, 1958 |
| 2,910,417 | Teitel | Oct. 27, 1959 |

FOREIGN PATENTS

| | | |
|---|---|---|
| 749,064 | Great Britain | May 16, 1956 |

OTHER REFERENCES

Nucleonics, vol. 12, No. 8, September 1954, page 19.

Proceedings of the International Conference on the Peaceful Uses of Atomic Energy, vol. III, United Nations, New York, 1956, pages 120–124, article by de Bruyn et al.

Goodman: The Science and Engineering of Nuclear Power, vol. I, Addison-Wesley Press, Inc., Cambridge, Mass., 1947, page 302.

Nucleonics, vol. 12, No. 7, July 1954, pages 11–13.

Atomic Energy Commission Documents:

CP–445, Low Density $UO_2$ Pile, Ibser, Feb. 24, 1943, 6 pages.

AECD–3647, The Reactor Handbook, vol. III, declassified edition, February 1955, pages 151 and 152.